(12) United States Patent
Karczewicz et al.

(10) Patent No.: US 9,819,940 B2
(45) Date of Patent: Nov. 14, 2017

(54) WEIGHTED PREDICTION BASED ON VECTORIZED ENTROPY CODING

(71) Applicant: QUALCOMM Incorporated, San Diego, CA (US)

(72) Inventors: Marta Karczewicz, San Diego, CA (US); Rahul Panchal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/739,858

(22) Filed: Jun. 15, 2015

(65) Prior Publication Data

US 2015/0281695 A1 Oct. 1, 2015

Related U.S. Application Data

(62) Division of application No. 12/351,684, filed on Jan. 9, 2009, now abandoned.
(Continued)

(51) Int. Cl.
*H04N 7/12* (2006.01)
*H04N 19/13* (2014.01)
(Continued)

(52) U.S. Cl.
CPC ........... *H04N 19/13* (2014.11); *H04N 19/105* (2014.11); *H04N 19/129* (2014.11);
(Continued)

(58) Field of Classification Search
CPC ...... H04N 19/11; H04N 19/129; H04N 19/18; H04N 19/61
See application file for complete search history.

(56) References Cited

U.S. PATENT DOCUMENTS

| 2006/0215762 A1 | 9/2006 | Han et al. |
| 2007/0014348 A1 | 1/2007 | Bao et al. |
| 2010/0098156 A1 | 4/2010 | Karczewicz et al. |

FOREIGN PATENT DOCUMENTS

| CN | 101228794 A | 7/2008 |
| JP | H05292462 A | 11/1993 |

(Continued)

OTHER PUBLICATIONS

Amonou I, et al., "Complexity reduction of FGS passes" Joint Video Team (JVT) of ISO/IEC MPEG & ITU-T VCEG(ISO/IEC JTC1/SC29/WG11 and ITU-T SG16 Q6), No. JVT-R069, Jan. 11, 2006 (Jan. 11, 2006), XP030006336 Bangkok, TH abstract section 3 with figures 1 and 2.

(Continued)

*Primary Examiner* — Young Lee
(74) *Attorney, Agent, or Firm* — Shumaker & Sieffert, P.A.

(57) ABSTRACT

A receiver receives coded coefficient values of enhancement layer video blocks. A control unit defines one or more vectors of transform coefficients for decoding of the enhancement layer blocks, and selects a prediction mode for the enhancement layer blocks based on the vectorized entropy decoding. Each of the vectors comprises one or more of the transform coefficients in a scan order having an end position indicated by a vector control signal. The control unit selects weighted prediction when the vectorized entropy decoding establishes two or more vectors, and selects non-weighted prediction when the defined vectorized entropy coding establishes a single vector. A prediction unit performs predictive decoding based on the prediction mode. An entropy decoding unit performs the vectorized entropy decoding. A scanning unit scans the enhancement layer video blocks from the vectors into two-dimensional blocks
(Continued)

of transform coefficients, and separately entropy decodes the vectors.

13 Claims, 8 Drawing Sheets

Related U.S. Application Data

(60) Provisional application No. 61/106,039, filed on Oct. 16, 2008.

(51) Int. Cl.

| | | |
|---|---|---|
| H04N 19/105 | (2014.01) | |
| H04N 19/46 | (2014.01) | |
| H04N 19/51 | (2014.01) | |
| H04N 19/129 | (2014.01) | |
| H04N 19/157 | (2014.01) | |
| H04N 19/18 | (2014.01) | |
| H04N 19/174 | (2014.01) | |
| H04N 19/184 | (2014.01) | |
| H04N 19/187 | (2014.01) | |
| H04N 19/34 | (2014.01) | |
| H04N 19/139 | (2014.01) | |
| H04N 19/159 | (2014.01) | |
| H04N 19/17 | (2014.01) | |

(52) U.S. Cl.
CPC ......... *H04N 19/139* (2014.11); *H04N 19/157* (2014.11); *H04N 19/159* (2014.11); *H04N 19/17* (2014.11); *H04N 19/174* (2014.11); *H04N 19/18* (2014.11); *H04N 19/184* (2014.11); *H04N 19/187* (2014.11); *H04N 19/34* (2014.11); *H04N 19/46* (2014.11); *H04N 19/51* (2014.11)

(56) References Cited

FOREIGN PATENT DOCUMENTS

| | | |
|---|---|---|
| JP | H0850984 A | 10/1996 |
| JP | 2006501740 A | 1/2006 |
| JP | 2008535310 A | 8/2008 |
| KR | 2006085148 | 7/2006 |
| KR | 20070000022 A | 1/2007 |
| KR | 20070074487 A | 7/2007 |
| KR | 20070121487 A | 12/2007 |
| WO | WO-2006101354 A1 | 9/2006 |
| WO | WO-06109141 A1 | 10/2006 |

OTHER PUBLICATIONS

Bao Y, et al., "FGS complexity reduction" Joint Video Team (JVT) of ISO/IEC MPEG & ITU-T VCEG(ISO/IEC JTC1/SC29/WG11 and ITU-T SG16 Q6), No. JVT-T087rl, Jul. 20, 2006 (Jul. 20, 2006), XP030006574 Klagenfurt, Austria abstract p. 1, paragraph 4—p. 7, line 3; figures 1-3.

Bao, Y., et al., "Improvements to fine granularity scalability for low-delay applications" Joint Video Team (JVT) of ISO/IEC MPEG & ITU-T VCEG(ISO/IEC JTC1/SC29/WG11 and ITU-T SG16 Q6), No. JVT-0054, Apr. 18, 2005 (Apr. 18, 2005), pp. 1-8, XP002415221 Busan, Korea section 2 with figure 3.

Bao Y, et al., "Report of core experiment on PR slice improvements (CEI)" Joint Video Team (JVT) of ISO/IEC MPEG & ITU-T VCEG(ISO/IEC JTC1/SC29/WG11 and ITU-T SG16 Q6). No. JVT-U125r2, Oct. 24, 2006 (Oct. 24, 2006), XP030006771 Hangzhou, China section 3 "Syntax, semantics and decoding process changes" p. 3, last paragraph.

Heiner Kirchhoffer, et al., "A Low-Complexity Approach for Increasing the Granularity of Packed-Based Fidelity Scalability in Scalable Video Coding" 26. Picture Coding Symposium;Jul. 11, 2007-Sep. 11, 2007; Lisbon, Portugal, Nov. 7, 2007 (Nov. 7, 2007), XP03.

International Search Report & Written Opinion—PCT/US2009/060707, International Search Authority—European Patent Office—dated Apr. 28, 2010.

Kamp S, et al., "Low-delay quality scalability using leaky base layer prediction" Joint Video Team (JVT) of ISO/IEC MPEG & ITU-T VCEG(ISO/IEC JTC1/SC29/WG11 and ITU-T SG16 Q6), No. JVT-U124-L, Oct. 24, 2006 (Oct. 24, 2006), XP030006770 Hangzhou, China abstract sections "Description" and "Discussion" with figure 1.

Kimoto T., "Activity on Scalable Video Coding in MPEG/JVT," Proceedings of the 2006 IEICE General Conference, Separate Volume: Information 2, The Institute of Electronics, Information and Communication Engineers, Mar. 8, 2006, pp. SS-34-SS-35, ISSN: 1349-1369.

Kirchhoffer H, et al., "CEI: Simplified FGS" Joint Video Team (JVT) of ISO/IEC MPEG & ITU-T VCEG(ISO/IEC JTC1/SC29/WG11 and ITU-T SG16 06), No. JVT-W090, Apr. 27, 2007 (Apr. 27, 2007), pp. 1-18, XP090007050 San Jose, California, USA abstract sections "Description of the approach" and "Experimental Results".

Taiwan Search Report—TW098135153—TIPO—dated Jan. 14, 2014.

Ji X., et al., "FGS Coding Using Cycle-Based Leaky Prediction Through Multiple Leaky Factors", IEEE Transactions on Circuits and Systems for Video Technology, IEEE Service Center, Piscataway, NJ, US LNKDDOI: 10.1109/TCSVT.2008.924104, vol. 18, No. 9, Oct. 8, 2008 (Oct. 8, 2008), pp. 1201-1211, XP011226684 ISSN: 1051-8215 abstract sections III-IV. with figures 1, 4.

Ono S., et al., "Ubiquitous Technology, High-Efficiency Coding of Moving Images—MPEG-4 and H.264—", Japan, Ohmsha Ltd., Apr. 20, 2005, 1st ed., pp. 120-124, 129-134, ISBN: 4-274-20060-4.

Reichel J., et al., "Joint Scalable Video Model JSVM-6", Document: JVT-S202, Joint Video Team (JVT) of ISO/IEC MPEG & ITU-T VCEG (ISO/IEC JTC1/SC29/WG11 and ITU-T SG16 Q.6), 19th Meeting: Geneva, Switzerland, 2006, pp. 1, 2, 43-45.

Sullivan,G., "Draft Text of Recommendation H.263 Version 2 ("H.263+") for Decision", ITU-T Study Group 16, Jan. 27, 1998, pp. i-v,1-144, XP000982914.

Yasuda, H., et al., "Information Compression Technique for Digital Broadcasting and Internet", Japan, Kyoritsu Shuppan Co., Ltd., Jun. 10, 1999, First Edition, pp. 23-31, 223-226, 281-283, 290, ISBN: 4-320-02936-4.

Zheng Yanyan, et al., "Block based FGS coding for low-delay applications" Joint Video Team (JVT) of ISO/IEC MPEG & ITU-T VCEG(ISO/IEC JTC1/SC29/WG11 and ITU-T SG16 06), No. JVT-U077rl, Oct. 22, 2006 (Oct. 22, 2006), XP030006723 Hangzhou, China Section Description of the proposed approach.

Bao, Y., et al., "CE7 Report, FGS coding for low-delay applications", Joint Video Team (JVT) of ISO/IEC MPEG & ITU-T VCEG (ISO/IEC JTC1/SC29/WG11 and ITU-T SG16 Q.6) 17th Meeting: Nice, FR, Oct. 14-21, 2005, [JVT-Q039].

WEIGHTED PREDICTION BASED ON VECTORIZED ENTROPY CODING

DIVISIONAL APPLICATION

This application is a divisional of U.S. application Ser. No. 12/351,684, filed Jan. 9, 2009, which claims the benefit of provisional U.S. Application Ser. No. 61/106,039 filed Oct. 16, 2008, the contents of both of which are incorporated herein by reference in their entirety.

TECHNICAL FIELD

This disclosure relates to block-based digital video coding used to compress video data.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

Block-based video compression techniques generally perform spatial prediction and/or temporal prediction. Intra-coding relies on spatial prediction to reduce or remove spatial redundancy between video blocks within a given coded unit, which may comprise a video frame, a slice of a video frame, or the like. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to track the movement of corresponding video blocks of two or more adjacent coded units.

A coded video block may be represented by prediction information that can be used to create or identify a predictive block, and a residual block of data indicative of differences between the block being coded and the predictive block. In the case of inter-coding, one or more motion vectors are used to identify the predictive block of data, while in the case of intra-coding, the prediction mode can be used to generate the predictive block. Both intra-coding and inter-coding may define several different prediction modes, which may define different block sizes and/or prediction techniques used in the coding. Additional types of syntax elements may also be included as part of encoded video data in order to control or define the coding techniques or parameters used in the coding process.

After block-based prediction coding, the video encoder may apply transform, quantization and entropy coding processes to further reduce the bit rate associated with communication of a residual block. Transform techniques may comprise discrete cosine transforms or conceptually similar processes, such as wavelet transforms, integer transforms, or other types of transforms. In a discrete cosine transform (DCT) process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients.

In many cases, a video sequence may be coded into a base layer and one or more enhancement layers. In this case, the base layer may define a base level of video quality, and one or more enhancement layers may enhance the quality of the decoded video signal. Enhancement layers may improve the video quality in a variety of ways, e.g., possibly providing spatial enhancements to base layer frames, possibly providing signal to noise enhancements, or possibly providing temporal enhancements to the decoded video by adding additional frames between the base layer frames. In any case, the encoded video may be transmitted to a video decoding device, which performs the reciprocal process of the video encoder in order to reconstruct the video sequence.

SUMMARY

In general, this disclosure describes methods that control the selection of predictive coding techniques for enhancement layer video blocks based on characteristics of vectorized entropy coding for such enhancement layer video blocks. Vectorized entropy coding refers to entropy coding of video blocks in reliance on a vector syntax element that defines the number of vectors associated with the video block. The vector syntax element may be defined for each coded unit, e.g., for each video frame or for each independently decodable slice or portion of a video frame. Each vector defined by the vector syntax element defines a set of coefficients of the video blocks that will be entropy coded together. If several vectors are defined for the video blocks of a coded unit, then several distinct sets of coefficients will be entropy coded separately for each of the video blocks. If only one vector is defined for the video blocks of a coded unit, then all of the coefficients for each given video block will be entropy coded together.

In accordance with this disclosure, the predictive techniques used for predictive-based video coding of enhancement layer video blocks are dependent upon the vectorized entropy coding used for such enhancement layer the video blocks. For each coded unit, predictive coding techniques (e.g. weighted or non-weighted prediction) may be selected depending upon whether the vectorized entropy coding defines a single vector for the video blocks of that coded unit or multiple vectors for the video blocks of that coded unit. In particular, weighted prediction may be selected when the vectorized entropy coding establishes two or more vectors for the enhancement layer video blocks.

Alternatively, non-weighted prediction such as sequential prediction may be selected when the vectorized entropy coding establishes a single vector for the enhancement layer video blocks. In this disclosure, weighted prediction refers to prediction that references weighted prediction data comprising a combination of predictive enhancement layer data and predictive base layer data. Sequential prediction, in contrast, refers to prediction that references the previously coded data, e.g., a predictive frame, of the same layer associated with the block being coded.

In one example, this disclosure provides a method of coding data of a video sequence. The method comprises defining one or more vectors for vectorized entropy coding of enhancement layer video blocks of a coded unit in the video sequence, selecting a prediction mode for the enhancement layer video blocks of the coded unit based on the defined vectorized entropy coding, wherein selecting the prediction mode includes selecting weighted prediction when the defined vectorized entropy coding establishes two or more vectors for the enhancement layer video blocks, and coding the enhancement layer video blocks based on the selected prediction mode and the vectorized entropy coding.

In another example, this disclosure provides an apparatus that codes data of a video sequence. The apparatus comprises a control unit that defines one or more vectors for vectorized entropy coding of enhancement layer video blocks of a coded unit in the video sequence, and selects a prediction mode for the enhancement layer video blocks of the coded unit based on the defined vectorized entropy coding, wherein the control unit selects weighted prediction when the defined vectorized entropy coding establishes two or more vectors for the enhancement layer video blocks. The apparatus also comprises a prediction unit that performs predictive coding techniques based on the selected prediction mode, and an entropy coding unit that performs the vectorized entropy coding.

In another example, this disclosure provides a device that codes data of a video sequence, the device comprising means for defining one or more vectors for vectorized entropy coding of enhancement layer video blocks of a coded unit in the video sequence, means for selecting a prediction mode for the enhancement layer video blocks of the coded unit based on the defined vectorized entropy coding, wherein means for selecting the prediction mode includes means for selecting weighted prediction when the defined vectorized entropy coding establishes two or more vectors for the enhancement layer video blocks, and means for coding the enhancement layer video blocks based on the selected prediction mode and the vectorized entropy coding.

In another example, this disclosure provides a device comprising a control unit that defines one or more vectors for vectorized entropy encoding of enhancement layer video blocks of a coded unit in the video sequence, and selects a prediction mode for the enhancement layer video blocks of the coded unit based on the defined vectorized entropy coding, wherein the control unit selects weighted prediction when the defined vectorized entropy coding establishes two or more vectors for the enhancement layer video blocks, a prediction unit that performs predictive encoding techniques based on the selected prediction mode, an entropy encoding unit that performs the vectorized entropy encoding to generate at least a portion of a bitstream, and a wireless transmitter that sends the bitstream to another device.

In another example, this disclosure provides a device comprising a wireless receiver that receives a bitstream comprising entropy coded coefficient values of enhancement layer video blocks of a coded unit in a video sequence, a control unit that defines one or more vectors for vectorized entropy decoding of the enhancement layer video blocks of the coded unit in the video sequence, and selects a prediction mode for the enhancement layer video blocks of the coded unit based on the defined vectorized entropy coding, wherein the control unit selects weighted prediction when the defined vectorized entropy coding establishes two or more vectors for the enhancement layer video blocks, a prediction unit that performs predictive decoding techniques based on the selected prediction mode, and an entropy decoding unit that performs the vectorized entropy decoding.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video coding device cause the device to code data of a video sequence. In particular, the instructions cause the device to define one or more vectors for vectorized entropy coding of enhancement layer video blocks of a coded unit in the video sequence, select a prediction mode for the enhancement layer video blocks of the coded unit based on the defined vectorized entropy coding, wherein the instructions cause the device to select weighted prediction when the defined vectorized entropy coding establishes two or more vectors for the enhancement layer video blocks, and code the enhancement layer video blocks based on the selected prediction mode and the vectorized entropy coding.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes methods that control the selection of predictive coding techniques for enhancement layer video blocks based on characteristics of vectorized entropy coding for such enhancement layer video blocks. In accordance with this disclosure, the predictive techniques used for predictive-based video coding of enhancement layer video blocks are dependent upon the vectorized entropy coding used for such enhancement layer the video blocks. For each coded unit, predictive coding techniques (e.g. weighted or non-weighted prediction) may be selected depending upon whether the vectorized entropy coding defines a single vector for the video blocks of that coded unit or multiple vectors for the video blocks of that coded unit.

Vectorized entropy coding refers to entropy coding of video blocks in reliance on a vector syntax element that defines the number of vectors associated with the video block. The vector syntax element may be defined for each coded unit, e.g., for each video frame or for each independently decodable slice or portion of a video frame. Each vector defined by the vector syntax element defines a set of coefficients of the video blocks that will be entropy coded together. If several vectors are defined for the video blocks of a coded unit, then several distinct sets of coefficients will be entropy coded separately for that coded unit. If only one vector is defined for the video blocks of a coded unit, then all of the coefficients for each given video block will be entropy coded together for that coded unit.

In accordance with this disclosure, weighted prediction may be selected when the vectorized entropy coding establishes two or more vectors for the enhancement layer video blocks. Alternatively, non-weighted prediction such as sequential prediction may be selected when the vectorized entropy coding establishes a single vector for the enhancement layer video blocks. In this disclosure, weighted prediction refers to prediction that references weighted prediction data comprising a combination of predictive enhancement layer data and predictive base layer data. Sequential prediction, in contrast, refers to prediction that references the previously coded data, e.g., a predictive frame, of the same layer associated with the block being coded.

Figure 1:
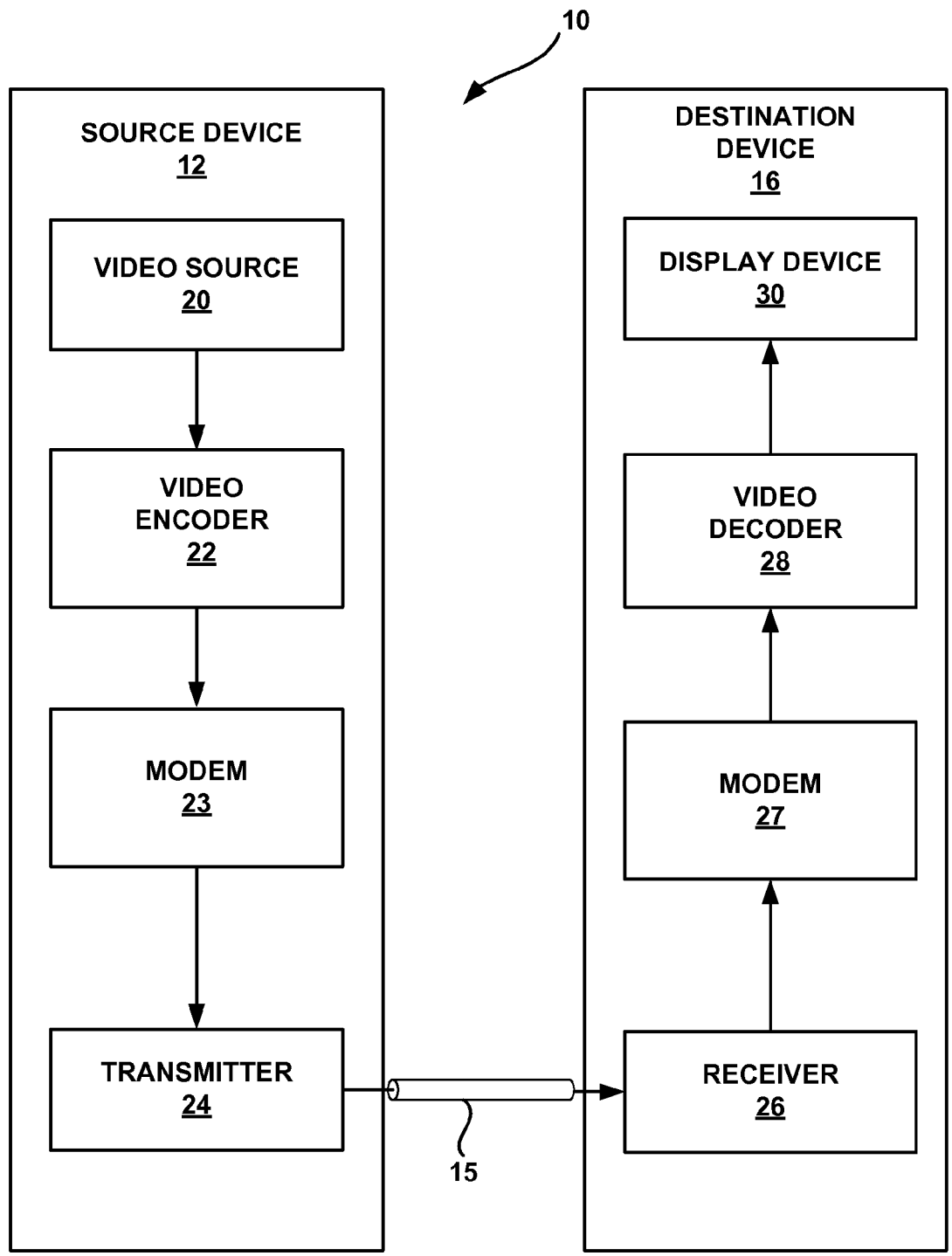
FIG. 1 is an exemplary block diagram illustrating a video encoding and decoding system.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply more generally to predictive coding and entropy coding, are not necessarily limited to wireless applications or settings, and may be applied to non-wireless devices including video encoding and/or decoding capabilities.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to perform vectorized entropy encoding and prediction techniques that are defined or selected based on the vectorized entropy encoding. Similarly, video decoder 28 of destination device 16 may be configured to perform vectorized entropy decoding and prediction techniques that are defined or selected based on the vectorized entropy decoding. In any case, the illustrated system 10 of FIG. 1 is merely exemplary. The vectorized entropy coding techniques and associated prediction techniques of this disclosure may be performed by any encoding or decoding devices. Source device 12 and destination device 16 are merely examples of coding devices that can support such techniques.

Video encoder 22 of source device 12 may encode video data received from video source 20 using the techniques of this disclosure. Video source 20 may comprise a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22.

Once the video data is encoded by video encoder 22, the encoded video information may then be modulated by modem 23 according to a communication standard, e.g., such as code division multiple access (CDMA) or another communication standard or technique, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antenna.

Receiver 26 of destination device 16 receives information over channel 15, and modem 27 demodulates the information. The video decoding process performed by video decoder 28 may include vectorized entropy decoding and prediction techniques that are defined or selected based on the vectorized entropy decoding, as described herein. Display device 28 displays the decoded video data to a user, and may comprise any of a variety of display devices such as a cathode ray tube (CRT), a liquid crystal display (LCD), a plasma display, an organic light emitting diode (OLED) display, or another type of display device.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate according to a video compression standard such as the ITU-T H.264 standard, alternatively referred to as MPEG-4, Part 10, Advanced Video Coding (AVC). However, the techniques of this disclosure may be readily applied to any of a variety of other video coding standards. Specifically, any standard that allows for vectorized entropy coding may benefit from the teaching of this disclosure.

Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/ decoder (CODEC) in a respective mobile device, subscriber device, broadcast device, server, or the like.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

During the encoding process, video encoder 22 may execute a number of coding techniques or steps. In general, video encoder 22 operates on video blocks within individual video frames (or other independently coded units such as slices) in order to encode the video blocks. The video blocks may have fixed or varying sizes, and may differ in size according to a specified coding standard. In some cases, each video frame may include a series of independently decodable slices, and each slice may include a series of macroblocks, which may be arranged into even smaller blocks. Macroblocks typically refer to 16 by 16 blocks of data. The ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. In this disclosure, the term video blocks refers to any size of video block. Video blocks may refer to blocks of video data in the pixel domain, or blocks of data in a transform domain such as discrete cosine transform (DCT) domain.

Video encoder 22 may perform predictive coding in which a video block being coded is compared to a predictive frame (or other coded unit) in order to identify a predictive block. The differences between the current video block being coded and the predictive block are coded as a residual block, and prediction syntax is used to identify the predictive block. The residual block may be transformed and quantized. Transform techniques may comprise a discrete cosine transform (DCT) or conceptually similar process, integer transforms, wavelet transforms, or other types of transforms. In a DCT process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient.

Following transform and quantization, entropy coding may be performed on the quantized and transformed residual video blocks. Syntax elements may also be included in the entropy coding. In general, entropy coding comprises one or more processes that collectively compress a sequence of quantized transform coefficients. Scanning techniques, such as zig-zag scanning techniques, are performed on the quantized transform coefficients in order to define one or more serialized one-dimensional vectors of coefficients from two-dimensional video blocks. The scanned coefficients are then entropy coded, e.g., via content adaptive variable length coding (CAVLC), context adaptive binary arithmetic coding (CABAC), or another entropy coding process.

Vectorized entropy coding refers to entropy coding of video blocks in reliance on a vector syntax element that defines the number of vectors associated with the video block. The vector syntax element may be defined for each coded unit, e.g., for each video frame or for each independently decodable slice or portion of a video frame. Each vector defined by the vector syntax element defines a set of coefficients of the video blocks that will be entropy coded together. If several vectors are defined for the video blocks of a coded unit, then several distinct sets of coefficients will be entropy coded separately for each of the video blocks of that coded unit. If only one vector is defined for the video blocks of a coded unit, then all of the coefficients for each respective video block will be entropy coded together for that coded unit.

In accordance with this disclosure, different types of prediction techniques may be used depending on the number of vectors defined for vectorized entropy coding of video blocks of a coded unit (e.g., a frame or slice). For example, video encoder 22 may select weighted prediction when the vectorized entropy coding establishes two or more vectors for the enhancement layer video blocks. Alternatively, video encoder 22 may select non-weighted prediction, such as sequential prediction, when the vectorized entropy coding establishes a single vector for the enhancement layer video blocks. In this disclosure, weighted prediction refers to prediction that references weighted prediction data comprising a combination of predictive enhancement layer data and predictive base layer data. Sequential prediction, in contrast, refers to prediction that references the previously coded data, e.g., a predictive frame, of the same layer (e.g., base or enhancement) associated with the block being coded.

Figure 2A:
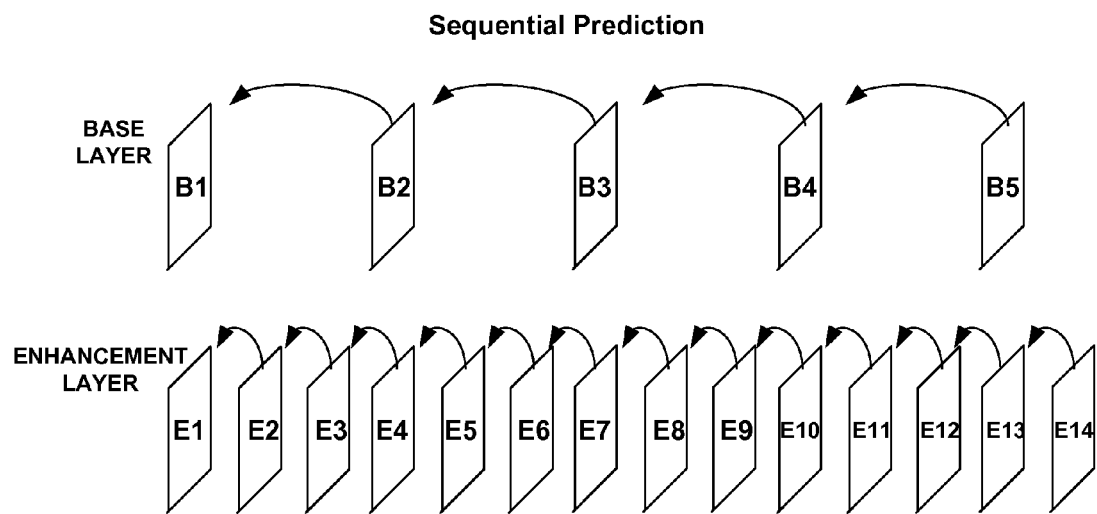
FIG. 2A is a conceptual diagram illustrating sequential prediction.
Figure 2B:
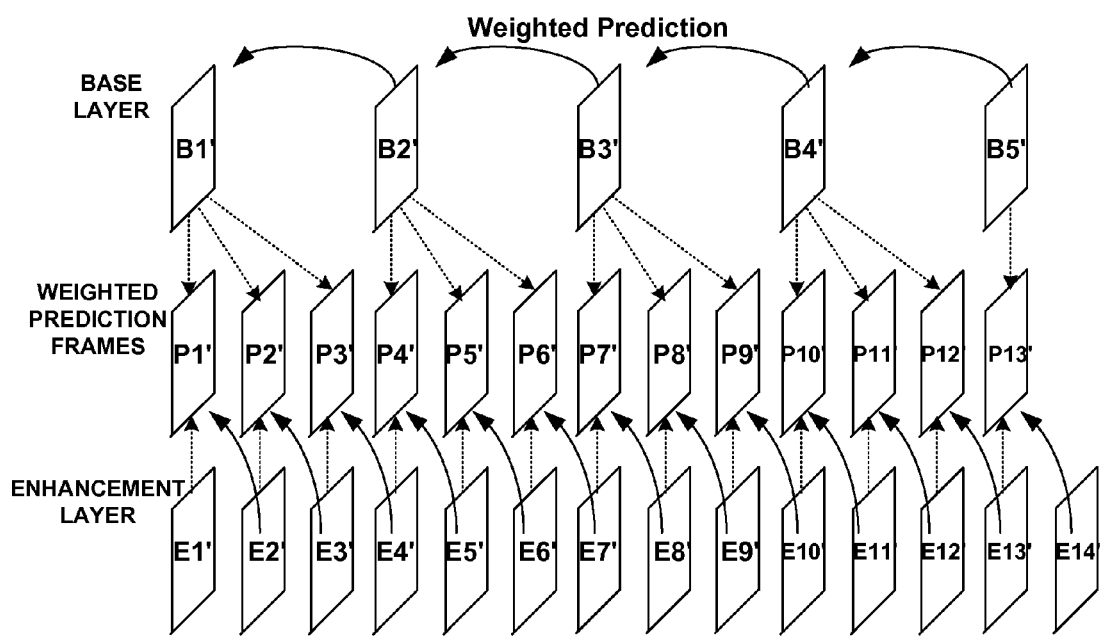
FIG. 2B is a conceptual diagram illustrating weighted prediction.

FIG. 2A is a conceptual diagram illustrating sequential prediction. FIG. 2B is a conceptual diagram illustrating weighted prediction (which may comprise so-called "Adaptive Refinement" prediction). Again, in accordance with this disclosure, video encoder 22 and video decoder 28 may select prediction techniques (e.g., weighted vs. non-weighted prediction) for enhancement layer video blocks based on the vectorized entropy coding applied to such video blocks. The adaptive refinement prediction technique may be selected, for example, when the vectorized entropy coding defines two or more vectors for the respective video blocks of a coded unit.

Scalable video coding (SVC) refers to video coding that makes use of a base layer and one or more enhancement layers. In this case, the base layer may define a base level of video quality, and one or more enhancement layers may enhance the quality of the decoded video signal. Enhancement layers may improve the video quality in a variety of ways, e.g., possibly providing spatial enhancements to base layer frames, possibly providing signal-to-noise enhancements by adding additional bit depth to pixel values of base layer frames, or possibly providing temporal enhancements to the decoded video by adding additional frames between the base layer frames. Video blocks coded in the base layer are referred to as base layer video blocks, while video blocks encoded in the enhancement layer are referred to as enhancement layer video blocks. In FIGS. 2A and 2B, base layer frames are denoted B1-B5 and B1'-B5', while enhancement layer frames are denoted as E1-E14 and E1'-E14'. Again, a frame may define a decodable unit, although slices or other portions of frames could define smaller decodable units.

FIG. 2A conceptually illustrates sequential prediction used in intra coding base layer and enhancement layer video blocks. In this case, the blocks of base layer frame B1 are used as the predictive references for the blocks of base layer frame B2. Similarly, the blocks of base layer frame B2 are used as the predictive references for the blocks of base layer frame B3, the blocks of base layer frame B3 are used as the predictive references for the blocks of base layer frame B4, and so forth. Motion estimation may be used to define a motion vector, which indicates displacement of a current video block in a current frame relative to a predictive video block of the predictive frame. Motion compensation, then, uses the motion vector to fetch or generate the predictive video block from the predictive frame.

In the enhancement layer, the blocks of enhancement layer frame E1 are used as the predictive references for the blocks of enhancement layer frame E2. Similarly, the blocks of enhancement layer frame E2 are used as the predictive references for the blocks of enhancement layer frame E3, the blocks of enhancement layer frame E3 are used as the predictive references for the blocks of enhancement layer frame E4, the blocks of enhancement layer frame E4 are used as the predictive references for the blocks of enhancement layer frame E5, and so forth. One potential problem with the sequential prediction techniques shown in FIG. 2A, however, is the potential for error drift. In this case, errors in one frame may be propagated to subsequent frames since the video blocks of each successive frame depends on those of the previous frame.

In order to address this issue of error drift, particularly in the enhancement layer, weighted prediction techniques have been developed. In this case, enhancement layer video blocks may be predicted from predictive blocks of predictive frames that comprise weighted averages of previous base and enhancement layer frames. For example, predictive frame P1' may comprise a weighted interpolation of base layer frame B1' and enhancement layer frame E1'. Blocks of enhancement layer frame E2 may be coded based on the blocks of predictive frame P1'. Predictive frame P2' may comprise a weighted interpolation of base layer frame B1' and enhancement layer frame E2', and enhancement layer frame E3 may be coded based on the blocks of predictive frame P2'. Predictive frame P3' may comprise a weighted interpolation of base layer frame B1' and enhancement layer frame E3', and enhancement layer frame E4 may be coded based on the blocks of predictive frame P3'. The dotted lines in FIG. 2B denote interpolation, and the backward arrows point to the prediction frame used to code a given frame.

Weighted prediction, such as that shown in FIG. 2B may help to avoid error drift. For example, if errors emerge in enhancement layer frame E2', these errors may be mitigated in predictive frame P2' due to the partial dependency of P2' on base layer frame B1'. Sequential prediction, as shown in FIG. 2A has the advantage of exploiting temporal redundancy, with the disadvantage of error propagation. In contrast, prediction of enhancement layer frames based solely on base layer frames may have an advantage of reduced error propagation, but does not exploit the phenomenon of temporal redundancy (which can improve compression) as well as sequential prediction. The weighted prediction scheme shown in FIG. 2B can balance these advantages and disadvantages to achieve a desirable balance of high compression (due to exploiting temporal redundancy) and mitigated error propagation (due to the dependency on robust base layer frames).

The weighted prediction may assign weights to the enhancement layer and base layer frames used to create the weighted prediction frames. Moreover, these weight factors may change or adapt over time. The weight factors are sometimes called "leaky factors," and may be defined by other terminology. In any case, the techniques of this disclosure are not dependent upon the types of weight factors used to define the different weighted prediction frames.

As mentioned above, different types of prediction techniques may be used depending on the number of vectors defined for vectorized entropy coding of video blocks of a coded unit. For example, weighted prediction similar to that shown in FIG. 2B may be selected when the vectorized entropy coding establishes two or more vectors for the enhancement layer video blocks. Alternatively, non-weighted prediction, such as sequential prediction similar to that shown in FIG. 2A, may be selected when the vectorized entropy coding establishes a single vector for the enhancement layer video blocks. Vectorized entropy coding may establish a single vector by either defining a single vector for a given frame or other coded unit, or by disabling the ability to define several vectors for a given frame or other coded unit.

Figure 2C:
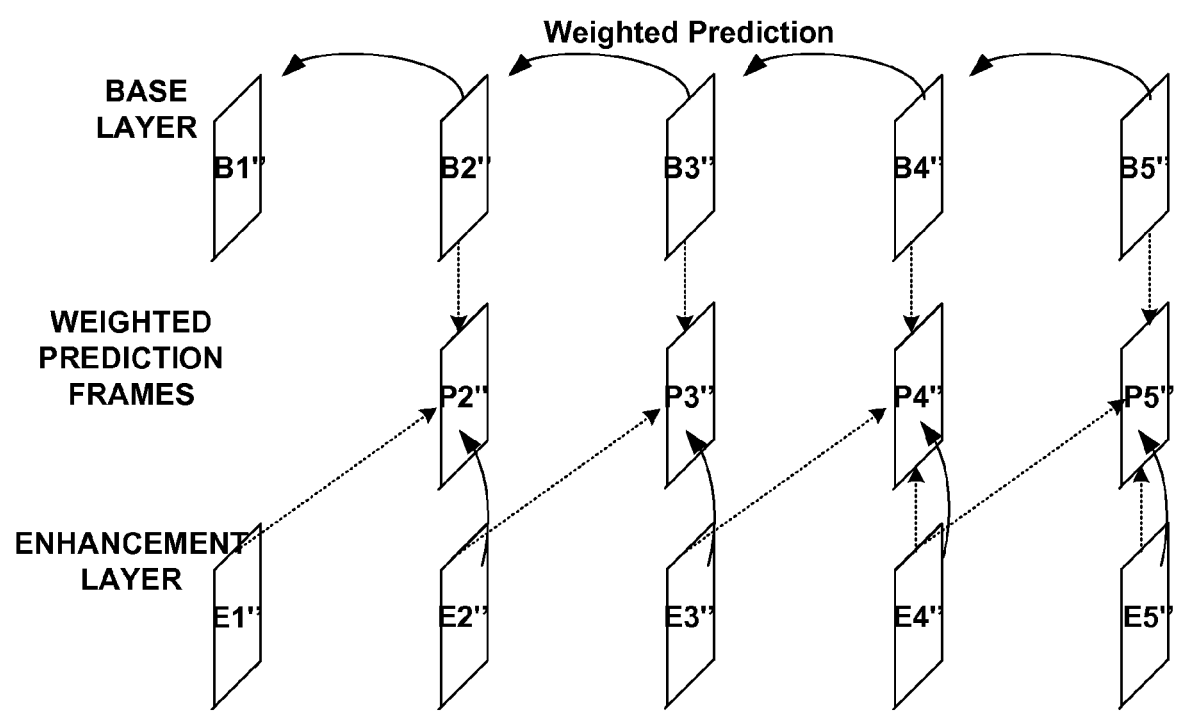
FIG. 2C is another conceptual diagram illustrating weighted prediction.

FIG. 2C is another conceptual diagram illustrating prediction of enhancement layer frames (E1" through E5") based on weighted predictive frames (P1" through P5"). In this case, a weighted interpolation of base layer frame B2" and enhancement layer frame E1" defines predictive frame P2". Similarly, a weighted interpolation of base layer frame B3" and enhancement layer frame E2" defines predictive frame P3" and so forth. As with FIG. 2B, the weight factors may change or adapt over time. In any case, in the example of FIG. 2C, temporally aligned base layer frames (aligned with the current enhancement layer frame) and previous enhancement layer frames may be interpolated to define the predictive frames. Other weighted combinations of base layer and enhancement layer interpolations could also be used to define the predictive frames.

Figure 3A:
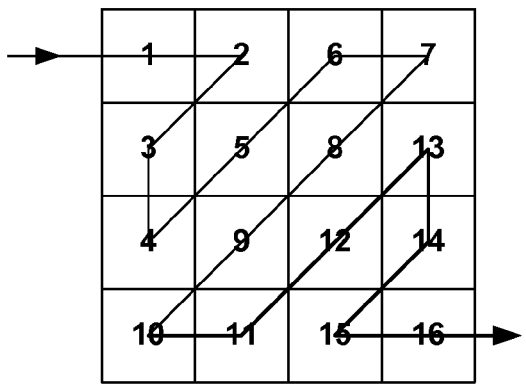
FIG. 3A is a conceptual diagram illustrating zig-zag scanning of a 4-by-4 video block.
Figure 3B:
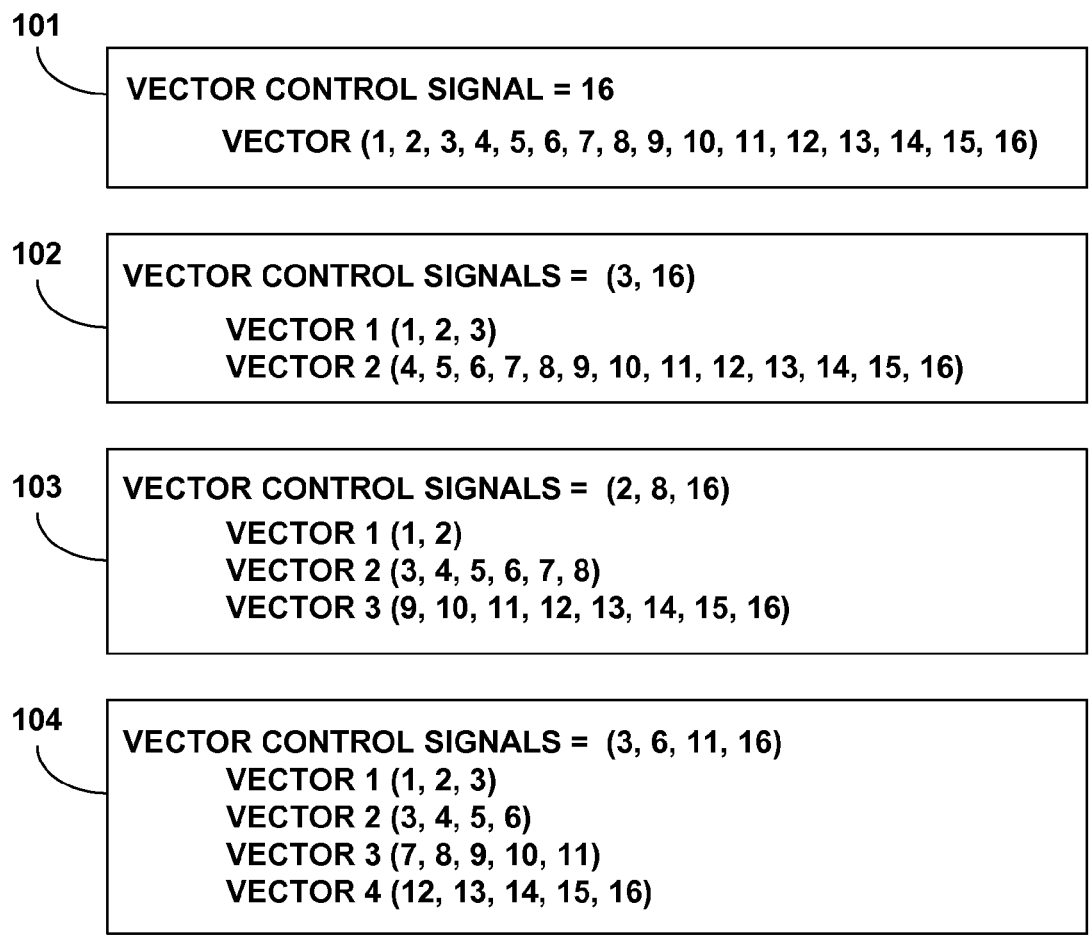
FIG. 3B is a diagram illustrating vectors associated with different vector control signals applied during zig-zag scanning of the block of FIG. 3A.

FIGS. 3A and 3B help to illustrate the concept of vectorized entropy coding. FIG. 3A is a conceptual diagram illustrating zig-zag scanning of a 4-by-4 video block, e.g., a transformed residual block of data associated with an enhancement layer. FIG. 3B is a diagram illustrating vectors associated with different vector control signals applied during zig-zag scanning of the block of FIG. 3A.

In FIG. 3A, the arrow illustrates a zig-zag pattern used to serialize the two-dimensional block of data into a linear sequence of data. Zig-zag scanning is merely one example, and generally, the scanning may be subject to a wide variety of patterns or scan orders. Importantly, however, the scanning is vectorized in order to support vectorized entropy coding. In particular, a vector control signal (or other syntax element) may define the number and size of one-dimensional vectors that will emerge from scanning the video block shown in FIG. 3A.

For example, as shown in FIG. 3B, if the vector control signal specifies the number 16 (see item 101), this may signify that the sixteen different coefficients of the 4 by 4 coefficient video block shown in FIG. 3A are included in a single vector. In particular, a vector control signal of 16 may result in a single vector comprising coefficients 1-16. In this case, entropy coding applies to the full set of coefficients 1-16. This scenario may also be defined for vectorized entropy coding by disabling the ability to define several vectors for a given coded unit (e.g., disabling a vector coding mode), rather than defining a single vector via control signal 16 (see item 101). When vectors are disabled, this has the same effect for vectorized coding as defining a single vector for a given coded unit.

In contrast, if the vector control signal specifies the numbers 3 and 16 (see item 102), this may signify that the different coefficients of the video block shown in FIG. 3A are included in a two different vectors, one having coefficients 1-3 and the other having coefficients 4-16. In this case, entropy coding applies separately to the two different sets of coefficients 1-3 and 4-16.

If the vector control signal specifies the numbers 2, 8 and 16 (see item 103), this may signify that the different coefficients of the video block shown in FIG. 3A are included in a three different vectors, one having coefficients 1-2, one having coefficients 3-8, and one having coefficients 9-16. In this case, entropy coding applies separately to the three different sets of coefficients 1-2, 3-8 and 9-16. If the vector control signal specifies the numbers 3, 6, 11, 16 (see item 104), this may signify that the different coefficients of the video block shown in FIG. 3A are included in a four different vectors, one having coefficients 1-3, one having coefficients 4-6, one having coefficients 7-11, and one having coefficients 12-16. In this case, entropy coding applies separately to the three different sets of coefficients 1-3, 4-6, 7-11 and 12-16.

The actual syntax used to specify the number or size of the different vectors is subject to a wide variety of implementations. Thus, the exemplary syntax shown in FIG. 3B is only used to demonstrate the concepts of this disclosure, and should not be considered limiting of the content or format of the control signals. The format for defining vectors for the video blocks of coded units could vary widely.

The techniques of this disclosure define the prediction (e.g., weighted or non-weighted prediction) based on whether vectorized entropy coding specifies a single vector (such as in the example of item 101 of FIG. 3B) or a plurality of vectors (such as in the examples of items 102, 103 and 104 of FIG. 3B). In particular, weighted prediction is used any time vectorized entropy coding defines a plurality of vectors for the video blocks of a coded unit, while non-weighted prediction, such as sequential prediction, is used any time the a single vector is defined for the video blocks of a coded unit for purposes of entropy coding. A single vector may be defined for the video blocks of a coded unit for purposes of entropy coding by selecting a vector control signal of 16 (e.g., as shown in item 101 of FIG. 3B), or possibly by disabling vector coding mode altogether for a given coded unit. Either way, if a single vector is defined for the video blocks of a coded unit for purposes of entropy coding, non-weighted prediction may be used.

Encoder 22 of source define 12 may communicate control signals to decoder 28 of destination device 18 as part of the syntax in order to define the type of prediction that should be used, or alternatively, encoder 22 and decoder 28 may automatically determine the type of prediction to use based on whether vectorized entropy coding is enabled and more than one vector is defined for the video blocks.

Figure 4:
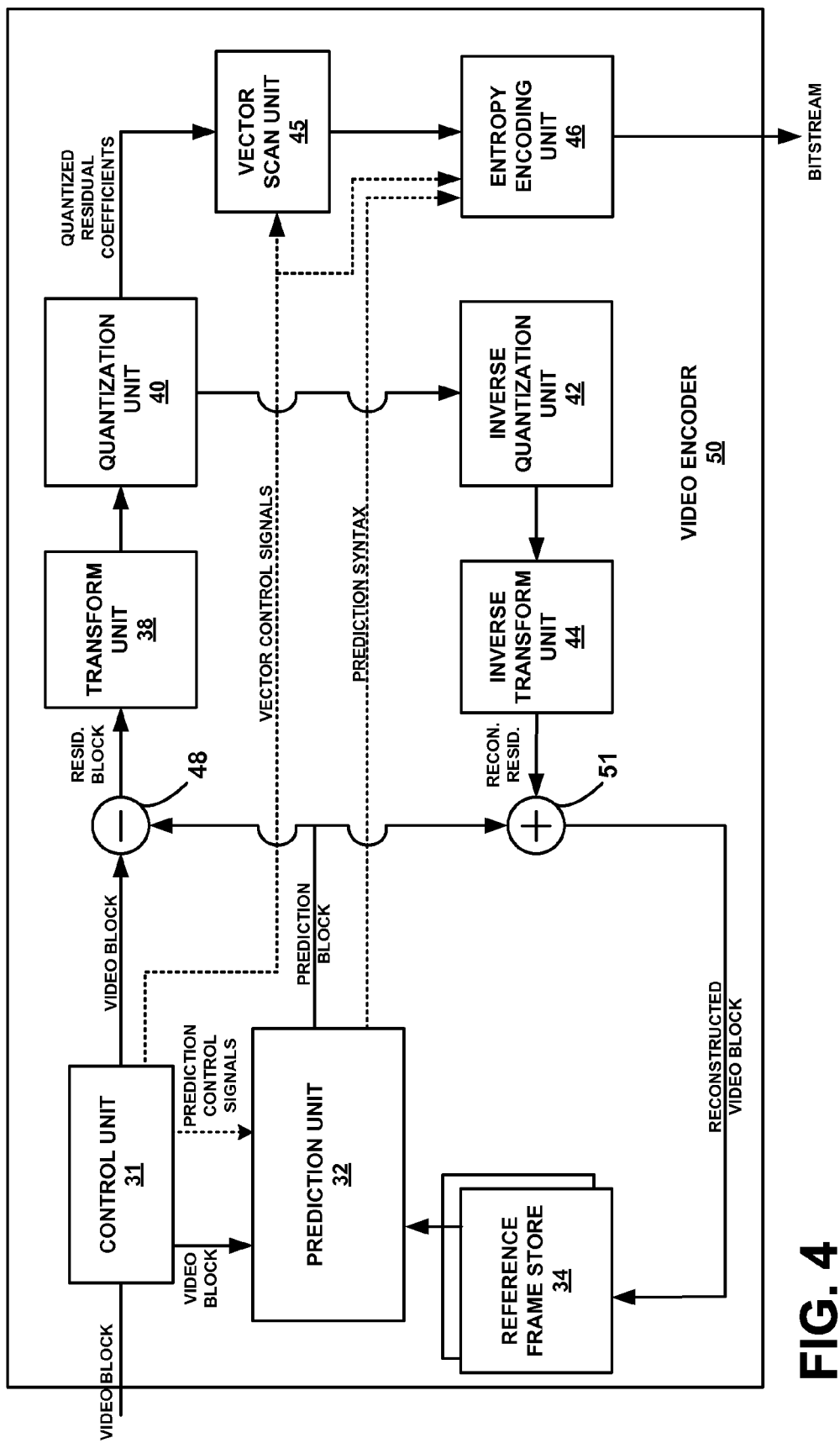
FIG. 4 is a block diagram illustrating an exemplary video encoder consistent with this disclosure.

FIG. 4 is a block diagram illustrating a video encoder 50 consistent with this disclosure. Video encoder 50 may correspond to video encoder 22 of device 20, or a video encoder of a different device. As shown in FIG. 4, vide encoder 50 comprises a control unit 31, a prediction unit 32, and a reference frame storage element 34. Video encoder also includes a transform unit 38 and a quantization unit 40, as well as inverse quantization unit 42, inverse transform unit 44 and adders 48 and 51. Finally, video encoder 50 also includes a vector scan unit 45 and an entropy coding unit 46.

In accordance with this disclosure, control unit 31 defines one or more vectors for vectorized entropy coding of enhancement layer video blocks of a coded unit in a video sequence being coded. Control unit 31 also selects a prediction mode for the enhancement layer video blocks of the coded unit based on the defined vectorized entropy coding. In particular, the control unit 31 selects weighted prediction when the defined vectorized entropy coding establishes two or more vectors for the enhancement layer video blocks. Alternatively, control unit 31 may select non-weighted prediction, such as sequential prediction, when the defined vectorized entropy coding establishes a single vector for the enhancement layer video blocks. Again, a single vector may be defined for the enhancement layer video blocks of a coded unit for purposes of entropy coding by selecting a vector control signal of 16 (e.g., as shown in item 101 of FIG. 3B), or possibly by disabling a vector coding mode altogether for a given coded unit. The vectors may be defined in any manner, and may be defined to balance or define the amount of data assigned to different layers.

Prediction unit 32 performs predictive coding techniques based on the selected prediction mode defined by prediction control signals from control unit 31. Thus, prediction unit 32 may support weighted or non-weighted prediction, but applies the appropriate prediction techniques at the direction of control unit 31. Corresponding vector control signals are also sent from control unit 31 to vector scan unit 45 and entropy coding unit 46. Vector scan unit 45 performs vectorized scanning, and entropy coding unit 46 performs vectorized entropy coding.

For inter coding of enhancement layer video blocks, prediction unit 32 compares the video block to be encoded to various blocks in one or more video reference frames. The predicted data may be retrieved from reference frame store 34, and may comprise video blocks of previous enhancement layer frames (such as shown in FIG. 2A) or weighted combinations of previous enhancement layer frames and base layer frames (such as shown in FIG. 2B).

Prediction unit 32 may generate prediction syntax, such as motion vectors, which can be used to identify the prediction blocks used to code the current enhancement layer video blocks. Prediction unit 32 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation.

Transform unit 38 applies a transform, such as a discrete cosine transform (DCT) or a conceptually similar transform, to the residual block, producing a video block comprising residual transform block coefficients. Block transform unit 38, for example, may perform other transforms defined by the H.264 standard, which are conceptually similar to DCT. Alternatively, wavelet transforms or integer transforms may be used.

Quantization unit 40 quantizes the residual transform coefficients to further reduce bit rate. Quantization unit 40, for example, may limit the number of bits used to code each of the coefficients. After quantization, vector scan unit 45 scans the quantized coefficient block from a two-dimensional representation to one or more serialized one-dimensional vectors. Again, the number of vectors scanned for a given video block is originally defined by control unit 31, which selects the number of vectors and selects the prediction techniques. Vector control signals from control unit 31 to vector scan unit 45 inform vector scan unit 45 how to scan the video block, and the number of vectors to create. The scan order may be pre-programmed (such as zig-zag scanning), or possibly adaptive based on previous coding statistics.

Following this scanning process, entropy encoding unit 46 encodes the quantized transform coefficients according to an entropy coding methodology, such as CAVLC or CABAC, to further compress the data. In particular, entropy encoding unit 46 applies vectorized coding based on the vector control signals sent from control unit 31. For example, entropy coding unit 46 may apply entropy coding separately for each of the different vectors scanned by vector scan unit 45. If a single vector is defined for the video blocks, entropy coding unit 46 may apply entropy coding to a set of coefficients that correspond to all of the coefficients of each video block. In this disclosure, entropy coding refers to any of a wide variety of entropy coding methodologies, such as content adaptive variable length coding (CAVLC), context adaptive binary arithmetic coding (CABAC), or other entropy coding methodologies.

CAVLC is one type of entropy coding technique supported by the ITU H.264/MPEG4, AVC standard, which may be applied on a vectorized basis by entropy coding unit 46. CAVLC uses variable length coding (VLC) tables in a manner that effectively compresses serialized "runs" of transform coefficients. In this case, each separate vector scanned by vector scan unit 45 is coded by entropy coding unit 46 according to CAVLC. In this case, entropy coding unit 46 codes each separate vector scanned by vector scan unit 45 according to CAVLC.

CABAC is another type of entropy coding technique supported by the ITU H.264/MPEG4, AVC standard, which may be applied on a vectorized basis by entropy coding unit 46. CABAC may involve several stages, including binarization, context model selection, and binary arithmetic coding. In this case, entropy coding unit 46 codes each separate vector scanned by vector scan unit 45 according to CABAC. Many other types of entropy coding techniques also exist, and new entropy coding techniques will likely emerge in the future. This disclosure is not limited to any specific entropy coding technique, but simply applies a given entropy coding technique on a vectorized basis, e.g., at the direction of vectorized control signals from control unit 31.

Following the entropy coding by entropy encoding unit 46, the encoded video may be transmitted to another device or archived for later transmission or retrieval. The encoded video may comprise the entropy coded vectors and various syntax, which can be used by the decoder to properly configure the decoding process. Inverse quantization unit 42 and inverse transform unit 44 apply inverse quantization and inverse transformation, respectively, to reconstruct the residual block in the pixel domain. Summer 51 adds the reconstructed residual block to the prediction block produced by prediction unit 32 to produce a reconstructed video block for storage in reference frame store 34. If desired, the reconstructed video block may also go through a deblocking filter unit (not shown) before being stored in reference frame store 34. The reconstructed video block may be used by prediction unit 32 as a reference block to inter-code a block in a subsequent video frame or as a weighed portion of a prediction block used for weighted prediction of blocks of a subsequent video frame.

Figure 5:
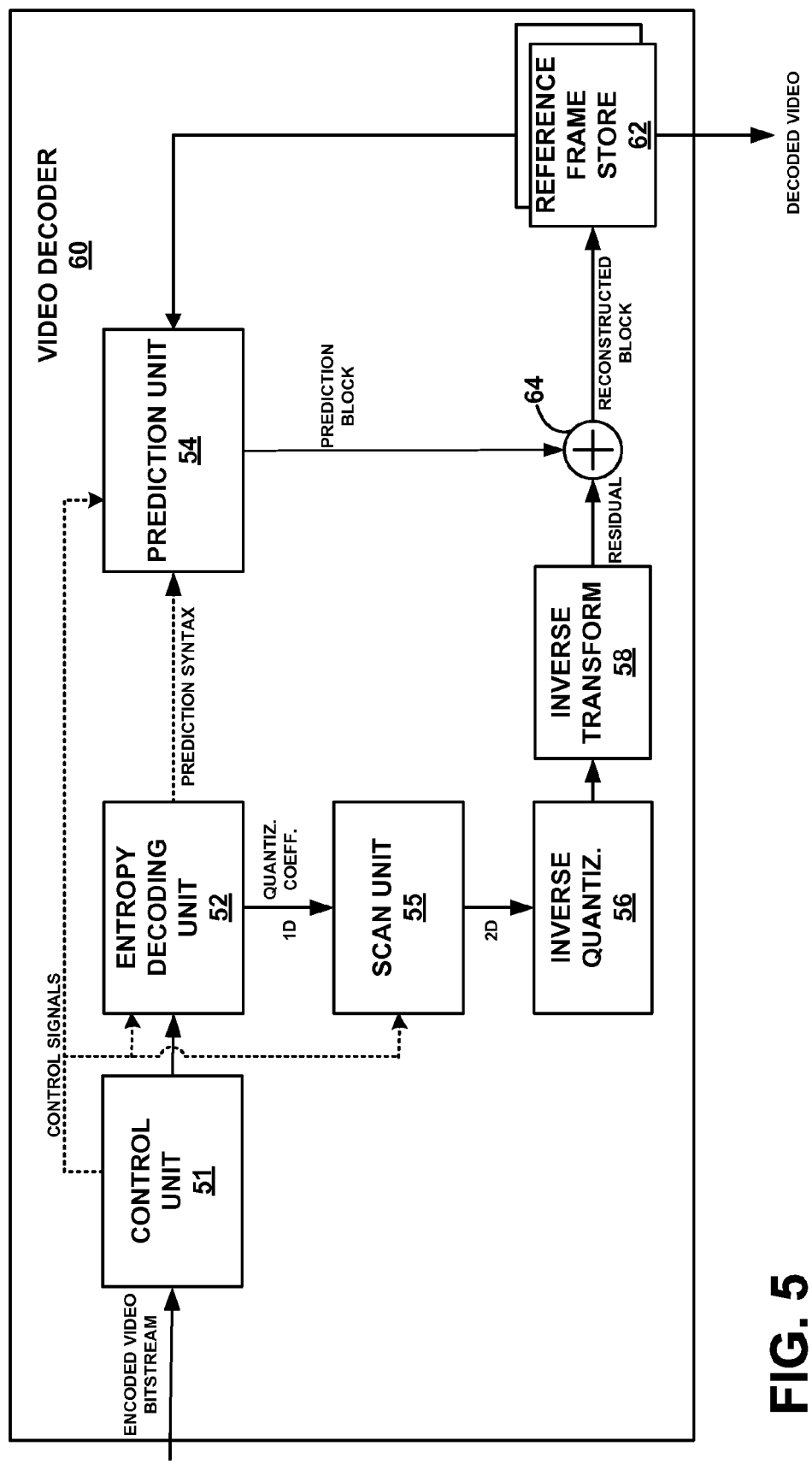
FIG. 5 is a block diagram illustrating an exemplary video decoder consistent with this disclosure.

FIG. 5 is a block diagram illustrating an example of a video decoder 60, which decodes a video sequence that is encoded in the manner described herein. The received video sequence may comprise an encoded set of image frames, a group of pictures (GOPs), or a wide variety of coded video that includes encoded video blocks and syntax to define how to decode such video blocks.

Video decoder 60 includes a control unit 31 that controls predictive decoding and vectorized entropy decoding in the manner described herein. In particular, control unit 31 receives an encoded video bitstream, and parses the bitstream in order to determine syntax that identifies whether vectorized entropy coding is enabled, and the size and number of the vectors. Control unit 31 forwards coded video to entropy decoding unit 52, and also forwards control signals to prediction unit 54, scan unit 55 and entropy decoding unit 52. The control signals ensure that weighted prediction is used anytime that two or more vectors are defined for vectorized entropy decoding, and that non-weighted prediction is used anytime a single vector is defined for vectorized entropy decoding (e.g., by defining a single vector or disabling a vector coding mode for a given coded unit).

Entropy decoding unit 52 performs the reciprocal decoding function of the encoding performed by entropy encoding unit 46 of FIG. 4. In particular, the entropy decoding may be vectorized in the sense that CAVLC or CABAC decoding may operate on vectorized sets of coefficients. Control unit 31 sends control signals that define the vectorized entropy decoding performed by entropy decoding unit 52. Video decoder 60 also includes a scan unit 55 that performs inverse scanning that is reciprocal to the scanning performed by a scan unit 45 of FIG. 2. In this case, scan unit 45 may combine one or more one-dimensional vectors of coefficients back into a two-dimensional block format. The number and size of the vectors, as well as the scan order defined for the video blocks define how the two-dimensional block is reconstructed.

Video decoder 60 also includes a prediction unit 54, an inverse quantization unit 56, an inverse transform unit 58, a reference frame store 62, and a summer 64. Optionally, video decoder 60 also may include a deblocking filter (not shown) that filters the output of summer 64. Prediction unit 54 receives prediction syntax (such as motion vectors) from entropy decoding unit 52. Prediction unit 54 also receives control signals from control unit 31, which define whether weighed prediction or non-weighted prediction should be used. Again, weighted prediction is defined when video blocks are scanned into a plurality of vectors and entropy coding applies separately for different vectors of a video block.

Inverse quantization unit 56 performs inverse quantization, and inverse transform unit 58 performs inverse transforms to change the coefficients of the video blocks back to the pixel domain. Summer 64 combines a prediction block from unit 54 with the reconstructed residual block from inverse transform unit 58 to generate a reconstructed block, which is stored in reference frame store 62. If desired, the reconstructed video block may also go through a deblocking filter unit (not shown) before being stored in reference frame store 62. Decoded video is output from reference frame store 62, and may also be fed back to prediction unit 54 for use in subsequent predictions.

Figure 6:
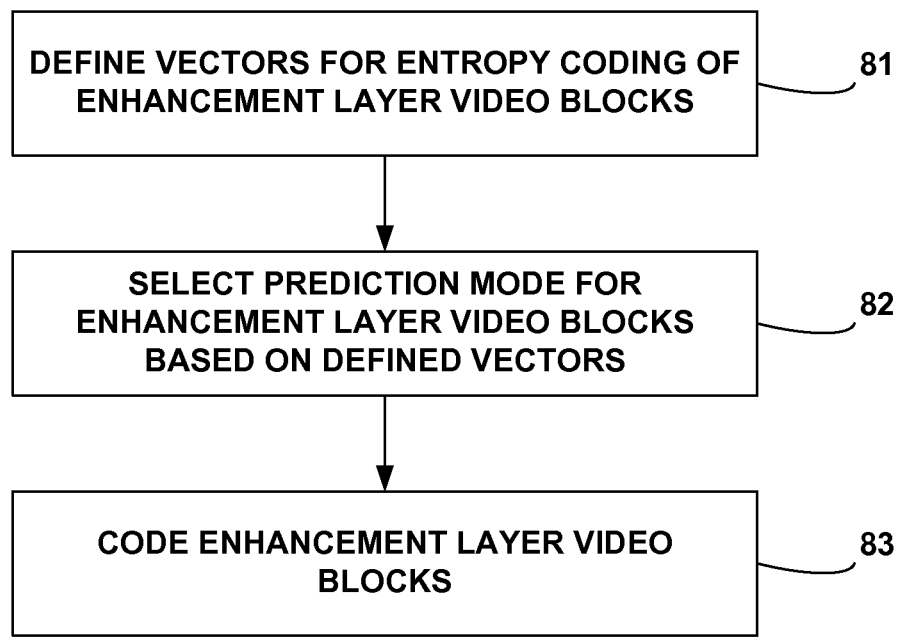
FIGS. 6 and 7 are flow diagrams illustrating techniques consistent with this disclosure.

FIG. 6 is a flow diagram illustrating a coding (i.e., encoding or decoding) technique for encoding enhancement layer video blocks consistent with this disclosure. FIG. 6 will be described from the perspective of video encoder 50, but a similar technique can also be applied by video decoder 60. In other words, both encoder 50 and decoder 60 may define vectors and select prediction (e.g., weighted or non-weighted prediction) based on the defined vectors. On the encoder side, vectors may be defined to promote coding efficiency. On the decoder side, vectors may be defined based on syntax that was defined by the encoder and received as part of the encoded video stream. Of course, on the encoder side, the scanning defines one-dimensional vectors based on two-dimensional blocks, whereas on the decoder side, the scanning works in reverse and defines two-dimensional blocks based on one-dimensional vectors.

As shown in FIG. 6, control unit 31 of video encoder 50 defines vectors for entropy coding of enhancement layer video blocks (81). Control unit 31 then selects a prediction mode (e.g., weighted or non-weighted prediction) based on the defined vectors (82). In particular, if a plurality of vectors is defined for the video block, control unit 31 selects weighted prediction, whereas if a single vector is defined for the video block, control unit 31 selects non-weighted prediction. Prediction unit 32 and vector scan unit 45 with entropy coding unit 46 code the enhancement layer video blocks based on the defined vectors and selected prediction mode (83). In particular, prediction unit 32 uses the selected prediction mode in predictive coding, and vector scan unit 45 and entropy coding unit 46 vector scan and entropy code the video block based on the defined vectors. In this case, vector scan unit 45 converts two-dimensional blocks into one or more one-dimensional vectors, and entropy coding unit 46 entropy codes the one or more one-dimensional vectors. By making the prediction mode (weighted or non-weighted prediction) dependent upon whether a single vector or multiple vectors are defined for the video block, the coding process may be improved.

Figure 7:
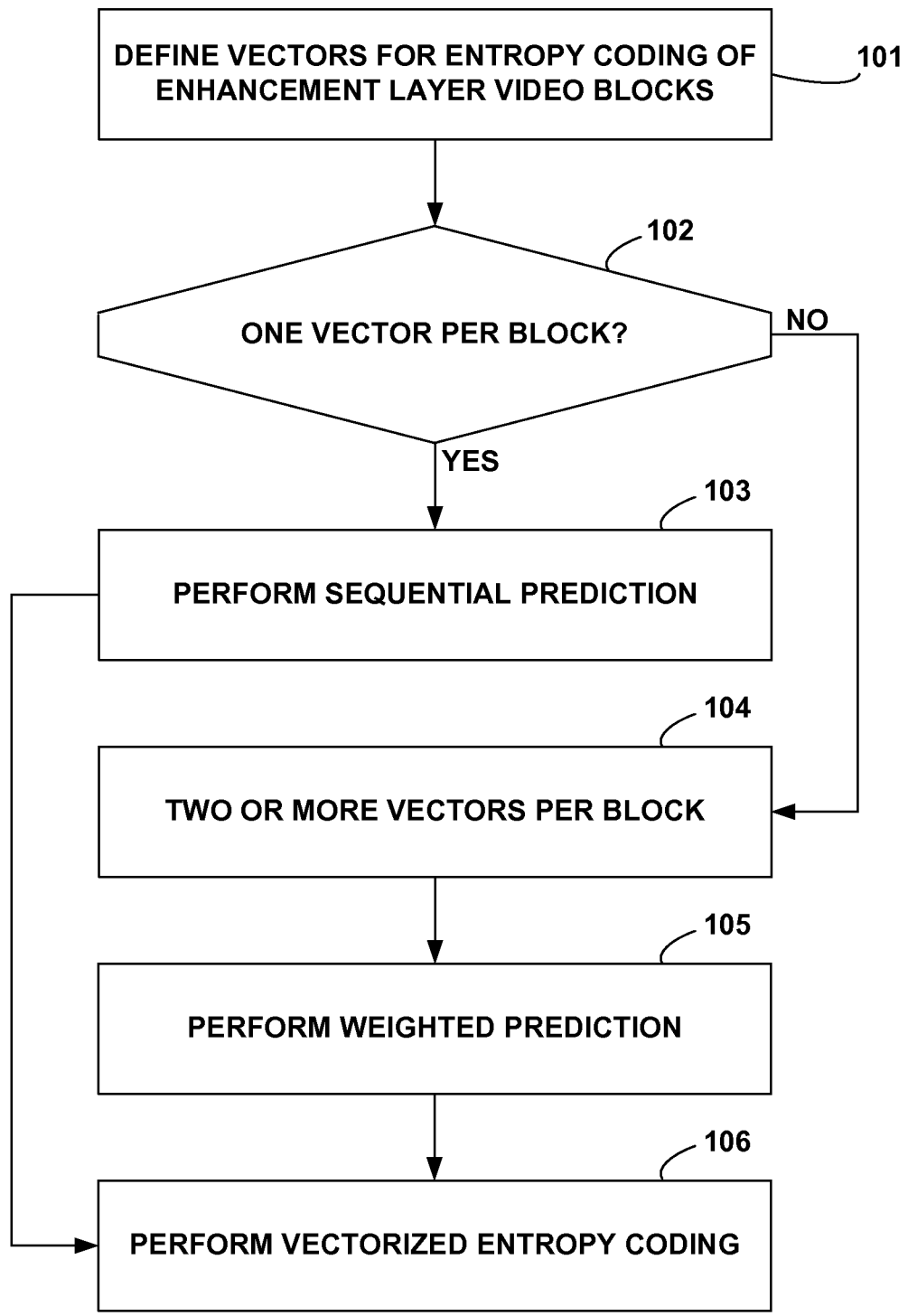

FIG. 7 is another flow diagram illustrating a coding (i.e., encoding or decoding) technique for encoding enhancement layer video blocks consistent with this disclosure. FIG. 7 will be described from the perspective of video encoder 50, but a similar technique can also be applied by video decoder 60. As shown in FIG. 7, control unit 31 of video encoder 50 defines vectors for entropy coding of enhancement layer video blocks (101). Control unit 31 then determines whether there is one vector per block (102) or a plurality of vectors per block. If there is one vector defined per video block ("yes" 102), control unit 31 directs prediction unit 32 to perform sequential prediction (103), such as shown in FIG. 2A and described above. However, if there are a plurality of vectors defined per video block ("no" 102), control unit 31 directs prediction unit 32 to perform weighted prediction (104), such as shown in FIG. 2B and described above. Control unit 31 then directs vector scan unit 45 and entropy coding unit 46 to perform vectorized entropy coding based on the defined vectors for the video block (106). In this case, scan unit 45 scans the predictively coded video block (e.g., the residual) from a two-dimensional format into one or more one-dimensional vectors based on the vectorized decision of control unit 31. Entropy coding unit 46 performs entropy coding separately with respect to the coefficients of each one-dimensional vector defined for the video block.

The techniques of this disclosure may be realized in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

What is claimed is:

1. A method of coding data of a video sequence, the method comprising:
    defining one or more vectors of transform coefficients for vectorized entropy coding of enhancement layer video blocks of a coded unit in the video sequence, wherein each vector of the defined one or more vectors comprises a set of one or more of the transform coefficients in a scan order having an end position indicated by a vector control signal;
    determining whether the defined one or more vectors include only one vector per enhancement layer video block of the enhancement layer video blocks or the defined one or more vectors include two or more vectors per enhancement layer video block of the enhancement layer video blocks;
    selecting a prediction mode for the enhancement layer video blocks of the coded unit by performing one of:
        selecting weighted prediction as the selected prediction mode in response to determining that the defined one or more vectors are determined to include two or more vectors per enhancement layer video block of the enhancement layer video blocks, the selected prediction mode of weighted prediction comprising prediction based on predictive blocks formed as weighted combinations of predictive enhancement layer video blocks and predictive base layer video blocks in the video sequence, or
        selecting non-weighted prediction as the selected prediction mode in response to determining that the defined one or more vectors are determined to include a single vector per enhancement layer video block of the enhancement layer video blocks, the selected prediction mode of non-weighted prediction comprising sequential prediction;
    coding the enhancement layer video blocks according to the selected prediction mode to form two-dimensional blocks of transform coefficients;
    vectorized entropy coding the two-dimensional blocks of transform coefficients by:
        scanning the two-dimensional blocks of transform coefficients into the defined one or more vectors; and separately entropy coding each vector of the defined one or more vectors, wherein the transform coefficients of the one or more vectors comprise one-dimensional sets of the two-dimensional blocks of transform coefficients, wherein coding the enhancement layer video blocks comprises separately entropy coding each one-dimensional set of the one-dimensional sets of the defined one or more vectors of transform coefficients; and coding one or more control signals that signify which coefficients of the two-dimensional blocks of coefficients are included in each defined vector of the defined one or more vectors of transform coefficients.

2. The method of claim 1, further comprising disabling a vector coding mode for the coded unit in order to define the single vector for vectorized entropy coding.

3. The method of claim 1, wherein coding comprises encoding, the method further comprising transmitting a bitstream comprising encoded video blocks.

4. The method of claim 1, wherein coding comprises decoding, the method further comprising receiving the video sequence as a bitstream comprising encoded video blocks.

5. An apparatus that codes data of a video sequence, the apparatus comprising:
a memory device configured to store the video sequence; and
a control unit coupled to the memory device, the control unit being configured to:
define one or more vectors of transform coefficients for vectorized entropy coding of enhancement layer video blocks of a coded unit in the video sequence stored to the memory device, wherein each vector of the defined one or more vectors comprises a set of one or more of the transform coefficients in a scan order having an end position indicated by a vector control signal;
determine whether the defined one or more vectors include only one vector per enhancement layer video block of the enhancement layer video blocks or the defined one or more vectors include two or more vectors per enhancement layer video block of the enhancement layer video blocks; and
select a prediction mode for the enhancement layer video blocks of the coded unit, wherein to select the selected prediction mode, the control unit is configured to:
select weighted prediction as the selected prediction mode based on the defined one or more vectors are determined to include two or more vectors per enhancement layer video block of the enhancement layer video blocks, the selected prediction mode of weighted prediction comprising prediction based on predictive blocks formed as weighted combinations of predictive enhancement layer video blocks and predictive base layer video blocks in the video sequence stored to the memory device; and
select non-weighted prediction as the selected prediction mode in response to determining that the defined one or more vectors are determined to include a single vector per enhancement layer video block of the enhancement layer video blocks, the selected prediction mode of non-weighted prediction comprising sequential prediction;
a prediction unit coupled to the control unit, the prediction unit being configured to code the enhancement layer video blocks according to the selected prediction mode to form two-dimensional blocks of transform coefficients;
a scanning unit coupled to the prediction unit, the scanning unit being configured to scan the two-dimensional blocks of transform coefficients into the defined one or more vectors; and
an entropy coding unit coupled to the scanning unit, the entropy coding unit being configured to perform the vectorized entropy coding on the two-dimensional block, wherein to perform the vectorized entropy coding, the entropy coding unit is configured to separately entropy code each vector of the defined one or more vectors, wherein the transform coefficients of the one or more vectors comprise one-dimensional sets of the two-dimensional blocks of transform coefficients, wherein to perform the vectorized entropy coding, the entropy coding unit is configured to code each one-dimensional set of the one-dimensional sets of the defined one or more vectors of transform coefficients, and
wherein the control unit is further configured to code one or more control signals, wherein the control signals signify which coefficients of the two-dimensional blocks of coefficients are included in each vector of the one or more vectors of transform coefficients.

6. The apparatus of claim 5, wherein the control unit is configured to disable a vector coding mode for the coded unit in order to define the single vector for vectorized entropy coding.

7. The apparatus of claim 5, wherein the control unit is configured to define the one or more vectors and select the prediction mode for each coded unit of a plurality of different coded units of the video sequence stored to the memory device.

8. The apparatus of claim 5,
wherein the entropy coding unit comprises an entropy encoding unit, and
wherein to entropy code each vector of the defined one or more vectors, the entropy encoding unit is configured to entropy encode each vector of the defined one or more vectors.

9. The apparatus of claim 5,
wherein the entropy coding unit comprises an entropy decoding unit, and
wherein to entropy code each vector of the defined one or more vectors, the entropy decoding unit is configured to entropy decode each vector of the defined one or more vectors.

10. The apparatus of claim 5, wherein the apparatus comprises at least one of an integrated circuit or a microprocessor.

11. The apparatus of claim 5, wherein the means for coding the enhancement layer video blocks comprises means for entropy decoding each vector of the defined one or more vectors, the device further comprising:
means for receiving the video sequence in an encoded video bitstream.

12. A device that codes data of a video sequence, the device comprising:
means for defining one or more vectors of transform coefficients for vectorized entropy coding of enhancement layer video blocks of a coded unit in the video sequence, wherein vector each of the defined one or more vectors comprises a set of one or more of the transform coefficients in a scan order having an end position indicated by a vector control signal;

means for determining whether the defined one or more vectors include only one vector per enhancement layer video block of the enhancement layer video blocks or whether the defined one or more vectors include two or more vectors per enhancement layer video block of the enhancement layer video blocks;

means for selecting a prediction mode for the enhancement layer video blocks of the coded unit, the means comprising:

means for selecting weighted prediction as the selected prediction mode based on the defined one or more vectors are determined to include two or more vectors per enhancement layer video block of the enhancement layer video blocks, the selected prediction mode of weighted prediction comprising prediction based on predictive blocks formed as weighted combinations of predictive enhancement layer video blocks and predictive base layer video blocks in the video sequence, and means for selecting non-weighted prediction as the selected prediction mode based on the defined one or more vectors are determined to include a single vector per enhancement layer video block of the enhancement layer video blocks, the selected prediction mode of non-weighted prediction comprising sequential prediction;

means for coding the enhancement layer video blocks according to the selected prediction mode to form two-dimensional blocks of transform coefficients, the means comprising means for separately entropy coding each one-dimensional set of the one-dimensional sets of the defined one or more vectors of transform coefficients;

means for scanning the two-dimensional blocks of transform coefficients into the one or more vectors;

means for performing the vectorized entropy coding, the means comprising:

means for scanning the two-dimensional blocks of transform coefficients into the defined one or more vectors;

means for separately entropy coding each vector of the one or more vectors, wherein the transform coefficients of the one or more vectors comprise one-dimensional sets of the two-dimensional blocks of transform coefficients; and means for coding each one-dimensional set of the one-dimensional sets of the defined one or more vectors of transform coefficients; and means for coding one or more control signals that signify which coefficients of the two-dimensional blocks of coefficients are included in each defined vector of the defined one or more vectors of transform coefficients.

13. The device of claim 12, wherein the means for coding the enhancement layer video blocks comprises means for entropy encoding each vector of the defined one or more vectors, the device further comprising:

means for transmitting a bitstream comprising at least a portion of the video sequence.

* * * * *